United States Patent
Tao et al.

(10) Patent No.: US 9,137,140 B2
(45) Date of Patent: Sep. 15, 2015

(54) AUTO TUNNELING IN SOFTWARE DEFINED NETWORK FOR SEAMLESS ROAMING

(71) Applicant: Cisco Technology, Inc., San Jose, CA (US)

(72) Inventors: Gaofeng Tao, Shanghai (CN); Alan Xiao-rong Wang, Shanghai (CN); Yu Zhang, Shanghai (CN); Dapeng Liu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 14/022,503

(22) Filed: Sep. 10, 2013

(65) Prior Publication Data
US 2015/0071111 A1  Mar. 12, 2015

(51) Int. Cl.
*H04L 12/751* (2013.01)
*H04L 12/24* (2006.01)
*H04W 36/38* (2009.01)
*H04W 76/02* (2009.01)

(52) U.S. Cl.
CPC ............ *H04L 45/02* (2013.01); *H04L 41/0816* (2013.01); *H04W 36/385* (2013.01); *H04W 76/022* (2013.01)

(58) Field of Classification Search
CPC ... H04W 40/248; H04W 40/34; H04W 40/36; H04W 48/17; H04L 41/0813–41/082; H04L 41/12; H04L 45/02
See application file for complete search history.

(56) References Cited

U.S. PATENT DOCUMENTS 6,654,359 B1 * 11/2003 La Porta et al. ............... 370/328
2006/0133341 A1 * 6/2006 Chari et al. .................... 370/338

OTHER PUBLICATIONS

Reitblatt, et al., "Consistent Updates for Software-Defined Networks: Change You Can Believe In!," Hotnets '11, Nov. 14-15, 2011, 6 pages.
Arye, et al., "A Formally-Verified Migration Protocol for Mobile, Multi-Homed Hosts," 20th IEEE International Conference on Network Protocols (ICNP '12), Oct. 2012, 12 pages.
International Search Report and Written Opinion in counterpart International Application No. PCT/US2014/051045, mailed Feb. 10, 2015, 10 pages.
Kempf et al., "Moving the Mobile Evolved Packet Core to the Cloud", 2012 IEEE 8th International Conference of Wireless and Mobile Computing, Networking and Communications (WIMOB), Oct. 2012, pp. 784-791.
Li et al., "Toward Software-Defined Cellular Networks", IEEE, Software Defined Networking (EWSDN), Oct. 2012, pp. 7-12.

* cited by examiner

*Primary Examiner* — Pao Sinkantarakorn
(74) *Attorney, Agent, or Firm* — Edell, Shapiro & Finnan, LLC

(57) ABSTRACT

A software defined network controller detects when a host has moved between network elements in a network. The controller generates a list of network elements to which the host has roamed, the list being sorted by time when the host is attached to a network element so that a most recent network element to which the host is attached is the root network element and at a head of the list. The controller updates the root network element in the list first for traffic flow associated with the host. The controller sends commands to the network elements to program a tunnel from each previous point of attachment network element in the list to the most recent root network element in the list in reverse order of the roaming path so as to route traffic for the host via a tunnel.

27 Claims, 10 Drawing Sheets

MATCH-ACTION-TABLE (EPOCH = 1)

| SWITCH | MATCH | ACTION |
|---|---|---|
| SW-A | MAC-A | OUTPUT = PHYSICAL PORT Gi0 PRIORITY = 10 EPOCH = 1 |
| SW-B | MAC-A | OUTPUT = PHYSICAL PORT Gi0 P10 E1 |
| SW-C | MAC-A | OUTPUT = PHYSICAL PORT Gi0 P10 E1 |
| SW-D | MAC-A | OUTPUT = PHYSICAL PORT Gi0 P10 E1 |
| SW-E | MAC-A | OUTPUT = PHYSICAL PORT Gi1 P10 E1 |
| SW-F | MAC-A | OUTPUT = PHYSICAL PORT Gi1 P10 E1 |

FIG.3

| SWITCH | MATCH | ACTION |
|---|---|---|
| SW-A | MAC-A | OUTPUT = LOGICAL PORT Tu0, NEXT_HOP = SW-B PRIORITY = 1(P1) |
| | | OUTPUT = Gi0 (PRE-CONVERGENCE) Gi1 (POST CONVERGENCE) P10 |
| SW-B (POA) | MAC-A | OUTPUT = Gi2 P10 |
| SW-C | MAC-A | OUTPUT = Gi0 P10 |
| SW-D | MAC-A | OUTPUT = Gi0 P10 |
| SW-E | MAC-A | OUTPUT = Gi1/Gi0 P10 |
| SW-F | MAC-A | OUTPUT = Gi1 P10 |

FIG.7A

| SWITCH | MATCH | ACTION |
|---|---|---|
| SW-A | MAC-A | OUTPUT = Tu0, nh = SW-D P1 |
| | | OUTPUT = Gi1 P10 |
| SW-B | MAC-A | OUTPUT = Tu0, nh = SW-D P1 |
| | | OUTPUT = Gi2/Gi1 P10 |
| SW-C | MAC-A | OUTPUT = Gi0/Gi1 P10 |
| SW-D (POA) | MAC-A | OUTPUT = Gi2 P10 |
| SW-E | MAC-A | OUTPUT = Gi1/Gi0 P10 |
| SW-F | MAC-A | OUTPUT = Gi1/Gi0 P10 |

FIG.7B

| SWITCH | MATCH | ACTION |
|---|---|---|
| SW-A | MAC-A | OUTPUT = Tu0, nh = SW-E P1 |
| | | OUTPUT = Gi1 P10 |
| SW-B | MAC-A | OUTPUT = Tu0, nh = SW-E P1 |
| | | OUTPUT = Gi1 P10 |
| SW-C | MAC-A | OUTPUT = Gi1 P10 |
| SW-D | MAC-A | OUTPUT = Tu0, nh = SW-E P1 |
| | | OUTPUT = Gi1/Gi2 P10 |
| SW-E (POA) | MAC-A | OUTPUT = Gi2 P10 |
| SW-F | MAC-A | OUTPUT = Gi0 P10 |

AUTO TUNNELING IN SOFTWARE DEFINED NETWORK FOR SEAMLESS ROAMING

TECHNICAL FIELD

The present disclosure relates to software defined networks.

BACKGROUND

In a software defined network (SDN) or OpenFlow network, when a host, which can be a physical device or a virtual machine, moves from one OpenFlow (OF) switch to another switch or router (referred to herein as a Point-Of-Attachment or POA switch/router), the network could experience traffic loss and/or a packet looping problem during network convergence for at least two reasons. First, the number of OpenFlow switches may be quite large and the algorithm to re-generate the new flow distribution tree or tables for the entire network takes time to converge. Second, there is network latency associated with the SDN controller updating the flow tables on each switch/router. Before network convergence is completed, traffic sent to a previous POA switch/router associated with a roaming host may be dropped/lost.

BRIEF DESCRIPTION OF THE DRAWINGS

FIG. 3 shows an example of a match-action table containing entries for the host prior to its movement between switches in the network shown in FIG. 1.

FIGS. 7A, 7B and 7C show example match-action tables during roaming of a host, and updated by the SDN controller according to the techniques presented herein.

DESCRIPTION OF EXAMPLE EMBODIMENTS

Overview

Presented herein are techniques for improving the performance of traffic handling in a software defined network when a host roams among network elements (e.g., switches or routers) in the network. Each of the network elements is capable of serving as a point of attachment of a virtual or physical host. A software defined network controller detects when a host has moved between network elements. The controller generates a list of network elements to which the host has roamed, the list being sorted by time when the host is attached to a network element so that a most recent network element to which the host is attached is the root network element and at a head of the list. The controller updates the root network element in the list first for traffic flow associated with the host. The controller sends commands to the network elements to program a tunnel from each previous point of attachment network element in the list to the most recent root network element in the list in reverse order of the roaming path so as to route traffic for the host via a tunnel.

Example Embodiments

Presented herein are techniques to program auto-tunnels from each previous point-of-attachment (POA) switch/router in a roaming path of a host to the latest root POA switch/router in the roaming path, so as to re-route the traffic flow for that host from previous POA nodes to the latest root POA node, to thereby minimize traffic (packet) loss. As explained further hereinafter, the programming is done in the reverse order of the roaming path to prevent packet looping and minimize traffic loss during network convergence independent of network size and particular convergence algorithms used.

Figure 1:
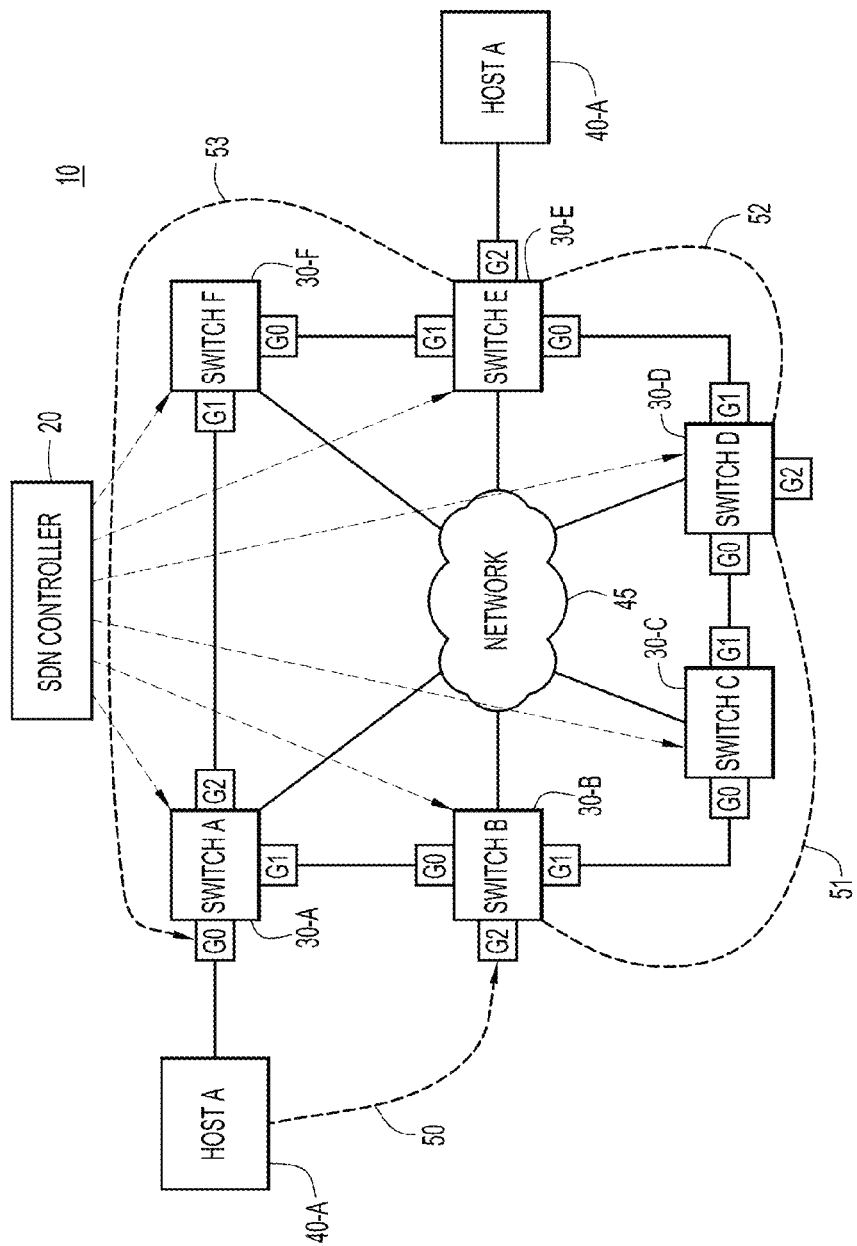
FIG. 1 is a diagram of an example of a network in which traffic flow for a host that roams between switches is managed and updated according to the techniques presented herein.

Reference is first made to FIG. 1, which shows an example network topology 10 in which the techniques presented may be employed for fast roaming when a host is moving within an SDN network. The example network topology 10 includes an SDN controller 20 and a plurality of switches (e.g., OpenFlow switches) 30-A, 30-B, 30-C, 30-D, 30-E and 30-F. The switches 30-A, 30-B, 30-C, 30-D, 30-E and 30-F are also labeled and referred to herein as switch A, switch B, switch C, switch D, switch E and switch F, respectively. The SDN controller 20 may take the form of a physical computing device or a virtual or cloud-based computing resource. Also, in the example shown in FIG. 1, a host 40-A, also designated as Host-A, is shown. The host 40-A may be a physical computing device or a virtual machine. The switches 30-A, 30-B, 30-C, 30-D, 30-E and 30-F connect to a network cloud shown at reference numeral 45, and the SDN controller 20 communicates, e.g., according to the OpenFlow protocol, with the switches via the network cloud 45 (even though FIG. 1 shows a direct connection between the SDN controller 20 and each of the switches). Each of the switches has a plurality of ports, and as an example, in FIG. 1, some of these ports are labeled as G0, G1 and G2 on the switches 30-A, 30-B, 30-C, 30-D, 30-E and 30-F. It should be understood that the switches 30-A through 30-E may be routers or switches, and therefore, for purposes of generalization, the switches are also referred to herein as "network elements" which is meant to include switches, routers, and other network devices that perform switching and routing functions in a network.

Figure 2:
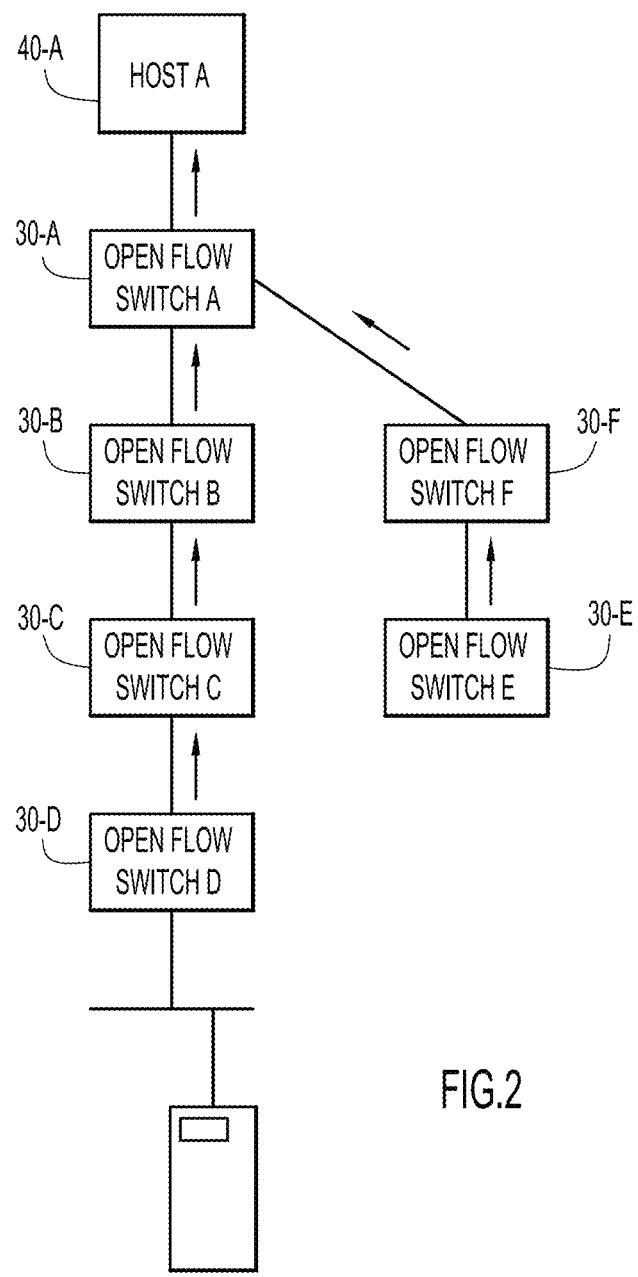
FIG. 2 is a block diagram showing the routing of traffic for a host prior to movement of the host between switches in the network shown in FIG. 1.

When host 40-A is rooted at switch A, traffic destined for host 40-A is routed by the switches shown in FIG. 1 to switch A, by the flow distribution tree depicted in FIG. 2. Switch D can reach switch A from both left and right paths shown in FIG. 2. In one example, the left path has lower cost or higher priority.

FIG. 3 shows the match-action table when host 40-A, with an address, e.g., media access control address (MAC) MAC-A, is rooted at switch A, for the flow distribution tree depicted in FIG. 2. FIG. 3 indicates, in the Action column, that traffic for host 40-A (MAC-A) is routed via port G0 on switches 30-A, 30-B, 30-C and 30-D, and via port G1 on switches 30-E and 30-F.

Reference is made back to FIG. 1. In the example of FIG. 1, host 40-A roams from switch A to switch B to switch D to switch E to switch A. This is represented by arrows 50, 51, 52 and 53. The SDN controller 20 creates a sorted list for all the POA switches along the roaming path of host 40-A. This list will include switches A, B, D and E for this roaming example.

As is appreciated by one with ordinary skill in the software defined networking, the SDN controller 20 communicates and controls the behavior of switches in the network, and to that end, is in frequent communication with the switches. Each switch in the network notifies the SDN controller 20 when a change has occurred, e.g., a host has moved from or to a switch. The SDN controller 20 can then make any needed change to the switches to properly route traffic associated with the roaming host. When a host POA change occurs, the SDN controller 20 needs to generate new flow distribution trees or tables for the entire network in order to ensure that traffic destined to or originating from that host is properly forwarded in the network. The generation of new flow distribution trees is referred to as "network convergence". There are many algorithms known to perform the computations for network convergence, which are outside the scope of this disclosure. Indeed, the techniques presented herein may be used in conjunction with any network convergence technique now known or hereinafter developed.

Figure 4:
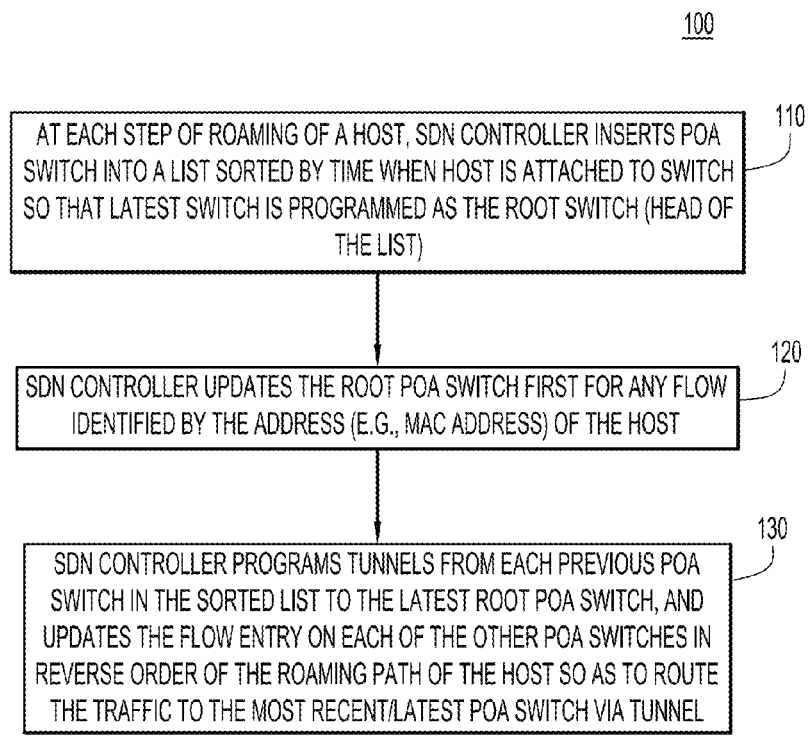
FIG. 4 is a flow chart depicting operations performed by a software defined network (SDN) controller to manage and update a traffic flow for a host that roams between switches.

When a host roams among the switches, the SDN controller 20 follows a specific procedure to ensure the flow can be re-routed to latest root POA switch with determined minimal traffic loss without waiting for network convergence to be completed. FIG. 4 illustrates a flow chart for this procedure, shown generally at reference numeral 100.

The SDN controller 20 detects when a host has moved between switches based on notifications and communications between the switches and the SDN controller 20, as part of normal SDN operations, e.g., according to the OpenFlow protocol. At 110, and at each step (switch change) of roaming of a host, the SDN controller 20 inserts a POA switch into a list sorted by time when host is attached to switch so that the latest or most recent switch to which the host roams is programmed as the root switch (head of the list). The SDN controller 20 maintains the list in a data structure for purposes of performing the techniques described herein.

For example, when host 40-A roams from switch A to switch B, the list generated by the SDN controller 20 is:

Sorted List (Epoch 2)
1. Switch B (head of the list)
2. Switch A

Likewise, when host 40-A roams from switch B to switch D, the list is:

Sorted List (Epoch 3)
1. Switch D (head of the list)
2. Switch B
3. Switch A

When host 40-A roams from switch D to switch E, the list is:

Sorted List (Epoch 4)
1. Switch E (head of the list)
2. Switch D
3. Switch B
4. Switch A Finally, when, in the example of FIG. 1, host 40-A roams from switch E back to switch A, the list is:

Sorted List (Epoch 5)
1. Switch A (head of the list)
2. Switch E
3. Switch D
4. Switch B Thus, the list generated by the SDN controller 20 is sorted by time when the host is attached to a switch so that a most recent switch to which the host is attached is programmed as the root switch and at a head (top) of the list.

At operation 120, the root POA switch in the sorted list is updated first for the traffic flow associated with the roaming host (e.g., identified by the address MAC-A for host 40-A) in order to absorb all re-routed traffic at that root POA switch. Thus, in the example above, at the point in time when host 40-A has roamed to switch D (from switch B), the SDN controller 40 would update switch D first.

At 130, the SDN controller 20 programs tunnels from each previous POA switch in the sorted list to the latest/most recent root switch in the list. For example, at Epoch 2, the SDN controller 20 would program a tunnel from switch A to switch B. At Epoch 3, the SDN controller 20 would program a tunnel from switch A to switch D and a tunnel from switch B to switch D. At Epoch 4, the SDN controller 20 would program a tunnel from switch A to switch E, a tunnel from switch B to switch E, and a tunnel from switch D to switch E, and so forth. Multiple flows may share the same tunnel.

In operation 130, the SDN controller updates the flow entry on each POA switch along the roamed path of the host in reverse order of the roaming path so as to route the traffic to the latest root switch via a tunnel. That is, tunnels are programmed in reverse order of the roaming path. This means that, in the example of the roaming path described above in connection with FIG. 1, at Epoch 2, the flow entry at switch B is updated first, then at switch A. At Epoch 3, the flow entry at switch D is updated, then switch B, then at switch A. At Epoch 4, the flow entry at switch E is updated, then at switch D, then at switch B, then at switch A.

It is understood that operation 130 involves sending commands (e.g., in accordance with the OpenFlow protocol) to the relevant switches in order to program a tunnel from each previous point of attachment switch in the list to the most recent root switch in the list in reverse order of the roaming path so as to route traffic for the host via a tunnel.

Figure 5:
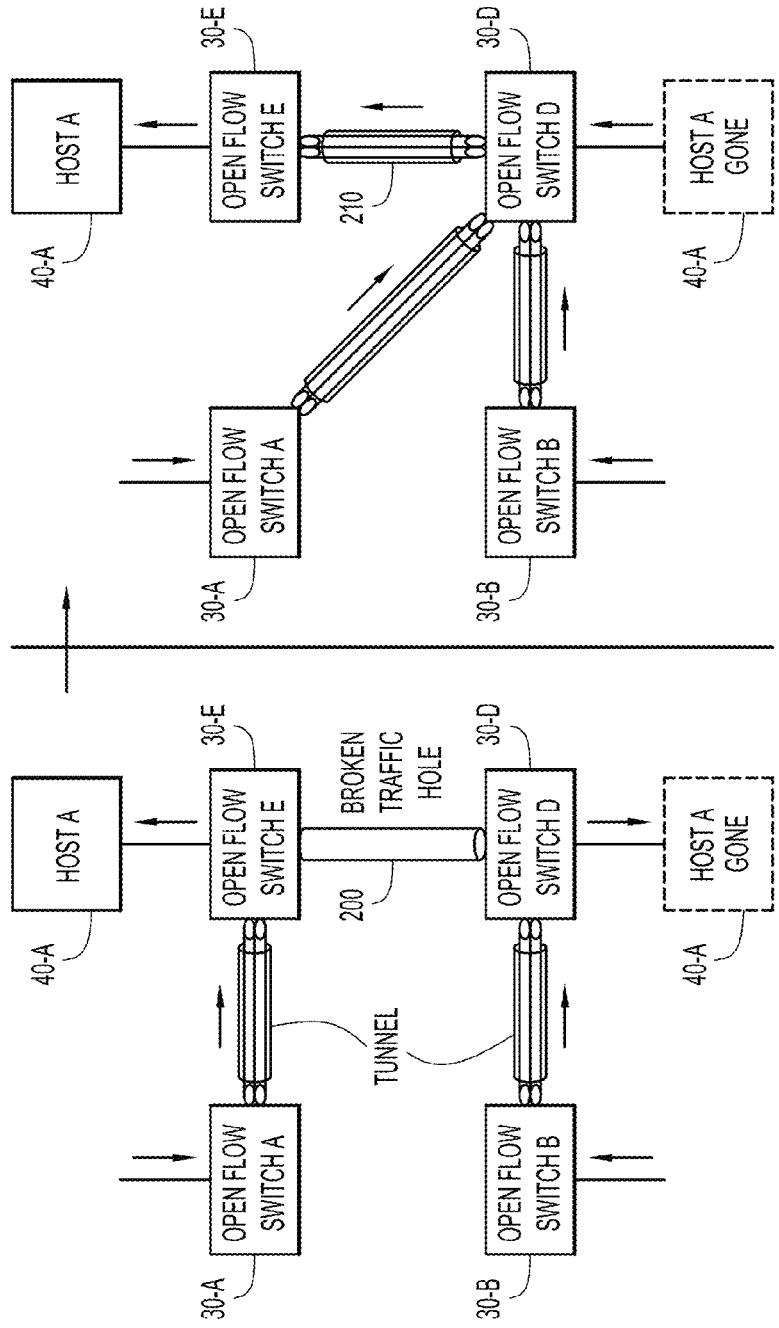
FIG. 5A is a diagram of a portion of a network and showing an example of a broken traffic flow when the techniques presented herein are not employed.
FIG. 5B is a diagram similar to FIG. 5A, and showing an example of traffic flow when the techniques presented herein are employed.

Turning now to FIGS. 5A and 5B, the order of updating the flow entry on each POA switch along the roaming path of a host is important for reasons now described. In the example of FIGS. 5A and 5B, the host 40-A roams from switch D to switch E. Thus, updating in reverse order in this example would involve updating the flow entry on switch E prior to switch D. FIG. 5A shows the scenario in which the flow entry on each POA switches is not updated in reverse order of the roaming path, that is, it is updated on switch D before switch E. As shown in FIG. 5A, a "broken traffic hole" as shown at reference numeral 200 can occur because traffic for host 40-A that is tunneled to switch D (from switch B) has no way to get to switch E where host 40-A is located. However, as shown in FIG. 5B, when the flow entry on switch E is updated first, and a tunnel 210 is created from the previous POA switch, switch D, in this example, to the latest/current POA switch, switch E. As a result, traffic from other switches, e.g., from switches B and A directed to host 40-A, can reach switch E where host 40-A is located.

Figure 6:
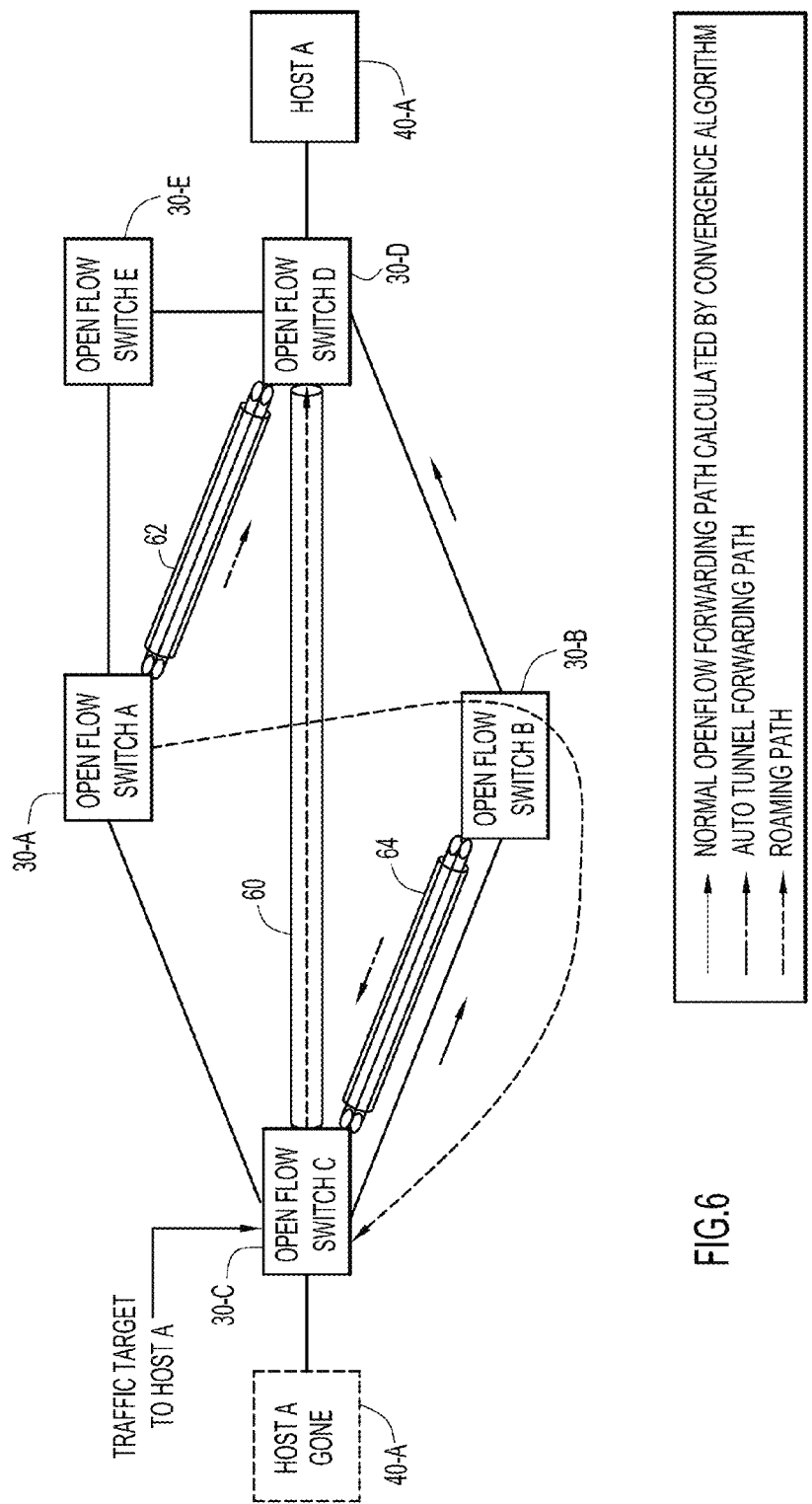
FIG. 6 is a diagram of a network in which a host has moved between switches, and showing benefits of the techniques presented herein.

Reference is now made to FIG. 6. The order of updating flow entries is also important to prevent traffic looping. In the example of FIG. 6, host 40-A roams from switch C to switch D (after roaming from switch B and prior to that from switch A). Thus, the roaming path is The roaming path is A→B→C→D. If the traffic flow for host 40-A in switch C is programmed to point to the physical port towards switch B and in switch B the flow is programmed to point back to switch C via a tunnel, a loop is created. On the other hand, if tunnels are programmed in reverse order of roaming as explained above in connection with operation 140 in FIG. 4, no traffic loop is created, and there is no dependency on how a convergence algorithm programs the flow. In the example of FIG. 6, when host 40-A is roaming from switch C to switch D, according to the techniques presented herein, a tunnel 60 on switch C pointing to switch D is programmed first before programming a tunnel 62 on switch A first to switch D. A tunnel 64 from switch C to switch B had been programmed for the prior step in the roaming path of host 40-A (from switch B to switch C). Since auto-tunnel flow has higher priority, traffic to host 40-A is re-distributed to the latest root POA switch via the tunnel 60 correctly without looping.

Once the network convergence is completed for a certain flow, the auto-tunnel forwarding path needs to removed and replaced with normal forwarding path for the flow, that is based on updated flow distribution trees/tables. The SDN controller 20 maintains the current POA switch in the list in order to re-route traffic seamlessly in case that host is continuously roaming. There are at least two ways to do the SDN controller may do this. First, the SDN controller 20 may remove the auto-tunnel forwarding path during network convergence. When the SDN controller 20 updates the flow on the POA switch according to a network convergence procedure, the SDN controller 20 removes, at the same time, the POA switch being updated from the aforementioned sorted list, and replaces the auto-tunnel forwarding path for this flow with a normal OpenFlow forwarding path.

Second, the SDN controller 20 removes the auto-tunnel forwarding path after network convergence. To this end, the SDN controller 20 updates the flow for the POA switch according to a network convergence algorithm as normal, but the auto-tunnel forwarding path has a higher priority than normal OpenFlow forwarding paths during network convergence. Both types of forwarding paths could coexist during convergence. After the flow is converged, the auto-tunnel forwarding path for this flow is removed in the same order of the roaming path to avoid any traffic hole.

The MAT tables are updated as shown in the example of FIGS. 7A, 7B and 7C, for the example roaming scenario of FIG. 1 (when host 40-A roams from switch A to switch B to switch D to switch E) and finally converges to the state as shown in FIG. 3. FIG. 7A shows the MAT table when a tunnel (Tu0) is created between switch A and switch B for traffic associated with host-A (when host-A roams from switch A to switch B). FIG. 7B shows the MAT table when host-A roams from switch B to switch D, and tunnels (Tu0) are created from switch B to switch D and from switch A to switch D. FIG. 7C shows the MAT table when host-A roams from switch D to switch E, and tunnels (Tu0) are created from switch D to switch E, switch B to switch E and switch A to switch E.

More specifically, and as an example, in row 2 (SW-A row) of FIG. 7A, an auto-tunnel rule is programmed with priority 1 (P1, higher priority) and the network convergence algorithm will program a native rule with priority 10 (P10). Before convergence, native rule points to physical port G0 towards old POA switch (port Gi0) and after updating as the result of the network convergence algorithm, the native rule points to port Gi1 towards the new POA switch. A similar operation occurs in MAT tables shown in FIGS. 7B and 7C. Thus, in the tables shown in FIGS. 7A-7C, the "Output Gi1/Gi0" indicates output is made via port Gi1 prior to network convergence and output is made via port Gi0 after network convergence. A similar meaning is intended by the expression "Output Gi2/Gi1", "Output Gi0/Gi1" and "Output Gi0/Gi1" in FIGS. 7A-7B. FIGS. 7A-7C thus reveal two aspects relevant to the techniques presented herein. First, an auto tunnel rule with higher priority is programmed independent of the native network convergence algorithm. That is, the SDN controller 20 sends commands to program the tunnel from each previous POA switch to the most recent root switch with a higher priority than that used for non-tunnel traffic forwarding as a result of a network convergence procedure. Second, once an auto tunnel rule is programmed, traffic is re-distributed immediately without waiting for the network convergence algorithm to complete.

There may be other rule dependencies that might change the granularity of the match or priority depending on a local flow-state. i.e., if there is a preexisting rule Match: MAC-A: Action: Drop. There are multiple options to deal with this scenario. The rule pertaining to using a tunnel to redistribute traffic is referred to as an auto-tunnel rule, and the preexisting rule or other OF rule to which there may be a conflict is referred to as a native rule.

Option 1: higher priority is given to auto-tunnel rule and these rules will be purged or removed from related POA nodes once network converge is complete, i.e., new configuration was downloaded to the entire network. The auto-tunnel rule and native rule will co-exist until the network is converged.

Option 2: introduce an epoch to all native rules for a flow within the SDN controller. When a virtual machine moves, and the SDN controller is to update a switch or router, it will give the rule a new epoch. When auto-tunnel rule is downloaded to a switch or router, the SDN controller shall check the epoch of native rule. If the epoch is new, the controller will skip to download auto-tunnel rule. In this way, updating native rule will override auto-tunnel rule if there is any. During network convergence, option 1 is simple but needs more rules because of the co-existence. Option 2 is complex but involves less rules.

Ultimately, it is necessary to purge the auto tunnel rules for POA switches or routers. In some unusual cases, for example, the message that convergence is complete is lost for whatever reason. The auto tunnel rules need to be purged even in these cases. In order to prevent malicious roaming or stale re-routing states, the SDN controller 20 may use a guard timer and a maximum number of POA switches. The guard timer is reset every time the sorted list of POA network devices is updated. A default value for the guard timer is set based on how fast a network can be converged. At expiration of the guard timer, the SDN controller sends commands to the switches to purge the auto tunnel rules programmed up to that point. In other words, the SDN controller 20 initiates a timer after the list of switches is updated, and at the expiration of the timer, the SDN controller sends commands to the switches to purge any tunnels associated with the roaming of the host that are programmed in the switches.

Furthermore, in creating the tunnels described above, the SDN controller 20 may use an Internet Protocol/Universal Datagram Protocol (IP/UDP) tunnel to exploit the advantages of UDP in connection with load balancing, firewall traversal and network address translation (NAT) interworking. A "light" header may be added over the UDP header to pass segment information in a multiple tenancy OpenFlow network. Moreover, a key could be assigned by the SDN controller 20 for each flow in this "light" header to represent flow identifier.

The foregoing techniques are not limited to layer 2 (L2) switching flow and can be applied to layer 3 (L3) flow routing, etc. Moreover, these techniques are independent of the particular underlying convergence algorithm to re-populate native flow distribution tree and enable re-routing traffic seamlessly after updating the head POA switch and the next-to-head POA switch. From the entire network point of view, the use of the auto-tunnels accelerates the network convergence.

To summarize, fast roaming techniques are presented herein that use sorted auto tunnels for an OpenFlow network, enabling re-routing of traffic seamlessly. These techniques operate independently of a network convergence algorithm and roaming frequency.

Figure 8:
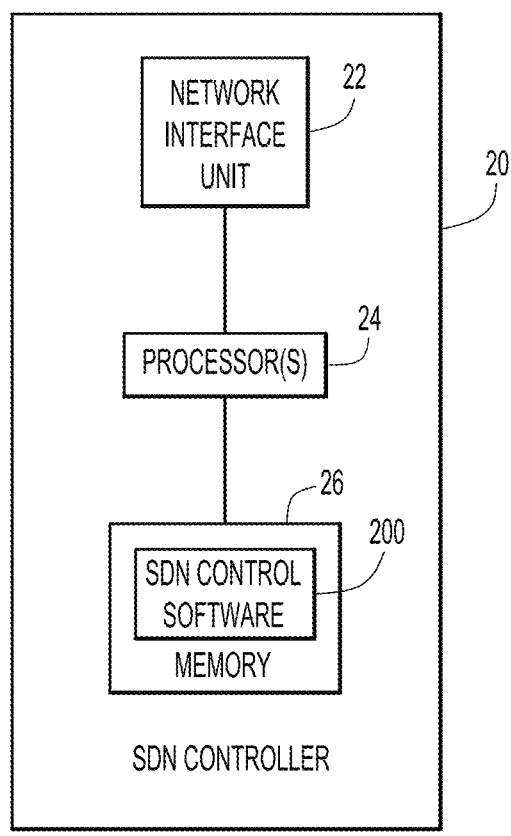
FIG. 8 is an example block diagram of the SDN controller configured to perform the techniques presented herein.

Reference is now made to FIG. 8, which shows a block diagram of an SDN controller 20 configured to perform the techniques described above in connection with FIGS. 1-6, 7A, 7B and 7C. The SDN controller 20 includes a network interface unit 22, one or more processors 24 and memory 26. The network interface unit 22 is an Ethernet card, and it enables network communications between the SDN controller 20 and each of the switches in the network under the SDN controller 20. The processors 24 may be one or more microprocessors or microcontrollers. The processors 24 execute software instructions stored in memory 26, such as SDN controller software 200 stored in memory 26.

The memory 26 may comprise read only memory (ROM), random access memory (RAM), magnetic disk storage media devices, optical storage media devices, flash memory devices, electrical, optical, or other physical/tangible memory storage devices. In general, the memory 26 may comprise one or more tangible (non-transitory) computer readable storage media (e.g., a memory device) encoded with software comprising computer executable instructions and when the software is executed (by the processor(s) 24) it is operable to perform the operations described herein.

The techniques presented herein provide a network-based solution to redistribute residual traffic within network during a host move (e.g., a virtual machine move) move without any modifications to the host's Transmission Control Protocol/Internet Protocol (TCP/IP) Protocol stack and the packet itself in the network being forwarded. For a virtual or "hot" virtual machine move, the SDN controller has a global view and control of the entire network, but re-configuring the entire network for those affected switches or routers in a consistent way is complex and takes some time. The techniques presented herein are not intended replace the above-mentioned re-configuring mechanism, but rather to accelerate traffic redistribution in a fast loop-less way, so that tunnels are programmed in a sorted order dynamically only for few specific switches or routers to which VM is/was attached without the need to update the entire network and host awareness. Once network reconfiguration (i.e., network convergence) is complete, the states programmed for traffic redistribution using auto tunnels will be purged.

In summary, a method is provided comprising: at a software defined network controller for a network comprising a plurality of network elements in communication with the controller, each of the network elements capable of serving as a point of attachment of a virtual or physical host, detecting when a host has moved between network elements; generating a list of network elements to which the host has roamed, the list being sorted by time when the host is attached to a network element so that a most recent network element to which the host is attached is the root network element and at a head of the list; updating the root network element in the list first for traffic flow associated with the host; and sending commands to the network elements to program a tunnel from each previous point of attachment network element in the list to the most recent root network element in the list in reverse order of the roaming path so as to route traffic for the host via a tunnel.

Similarly, an apparatus is provided comprising: a network interface unit configured to enable communications in a network with a plurality of network elements capable of serving as a point of attachment of a virtual or physical host, detecting when a host has moved between network elements; and a processor coupled to the network interface unit. The processor is configured to: detect when a host has moved between network elements; generate a list of network elements to which the host has roamed, the list being sorted by time when the host is attached to a network element so that a most recent network element to which the host is attached is the root network element and at a head of the list; update the root network element in the list first for traffic flow associated with the host; and send commands to the network elements to program a tunnel from each previous point of attachment network element in the list to the most recent root network element in the list in reverse order of the roaming path so as to route traffic for the host via a tunnel.

Further still, one or more computer readable storage media are provided encoded with instructions that, when executed by a processor, cause the processor to: at a software defined network controller for a network comprising a plurality of network elements in communication with the controller, each of the network elements capable of serving as a point of attachment of a virtual or physical host, detecting when a host has moved between network elements; generate a list of network elements to which the host has roamed, the list being sorted by time when the host is attached to a network element so that a most recent network element to which the host is attached is the root network element and at a head of the list; update the root network element in the list first for traffic flow associated with the host; and send commands to the network elements to program a tunnel from each previous point of attachment network element in the list to the most recent root network element in the list in reverse order of the roaming path so as to route traffic for the host via a tunnel.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
at a software defined network controller for a network comprising a plurality of network elements in communication with the controller, each of the network elements capable of serving as a point of attachment of a virtual or physical host, detecting when a host has moved between network elements;
generating a list of network elements to which the host has roamed, the list being sorted by time when the host is attached to a network element so that a most recent network element to which the host is attached is the root network element and at a head of the list;
updating the root network element in the list first for traffic flow associated with the host; and
sending commands to the network elements to which the host has roamed to program a tunnel from each previous point of attachment network element in the list to the most recent root network element in the list in reverse order of the roaming path so as to route traffic for the host via a tunnel.

2. The method of claim 1, further comprising, at the controller, sending commands to the network elements to which the host has roamed to remove the tunnels created during roaming of the host during execution of a network convergence procedure to replace a tunnel forwarding path for traffic flow for the host with a normal forwarding path.

3. The method of claim 1, further comprising sending commands to the network elements to which the host has roamed to remove the tunnels created during roaming of the host after execution of a network convergence procedure such that a tunnel forwarding path has a higher priority than normal forwarding paths during network convergence.

4. The method of claim 3, wherein sending commands comprises sending commands to the network elements to which the host has roamed to replace a tunneling forwarding path for a flow for the host with a normal forwarding path during network convergence.

5. The method of claim 1, further comprising storing data representing a maximum number of network elements to which a host may roam, and wherein generating the list is terminated when it is determined that the host has roamed to more than the maximum number of network elements.

6. The method of claim 1, wherein detecting comprises detecting a roam of the host based on a layer 2 address of the host.

7. The method of claim 1, wherein detecting comprises detecting a roam of the host based on a layer 3 address of the host.

8. The method of claim 1, wherein sending comprises sending commands to program the tunnel from each previous point of attachment network element in the list to the most recent root network element with a higher priority than that used for non-tunnel traffic forwarding as a result of a network convergence procedure.

9. The method of claim 1, further comprising initiating a timer after the list of network elements is updated, and at expiration of the timer, sending commands to the network elements to which the host has roamed to purge any tunnels associated with the roaming of the host that are programmed in the network elements to which the host has roamed.

10. An apparatus comprising:
   a network interface unit configured to enable communications in a network with a plurality of network elements capable of serving as a point of attachment of a virtual or physical host, detecting when a host has moved between network elements; and
   a processor coupled to the network interface unit, wherein the processor is configured to:
      detect when a host has moved between network elements;
      generate a list of network elements to which the host has roamed, the list being sorted by time when the host is attached to a network element so that a most recent network element to which the host is attached is the root network element and at a head of the list;
      update the root network element in the list first for traffic flow associated with the host; and
      send commands to the network elements to which the host has roamed to program a tunnel from each previous point of attachment network element in the list to the most recent root network element in the list in reverse order of the roaming path so as to route traffic for the host via a tunnel.

11. The apparatus of claim 10, wherein the processor is further configured to:
   store data representing a maximum number of network elements to which a host may roam; and
   terminate generating the list when it is determined that the host has roamed to more than the maximum number of network elements.

12. The apparatus of claim 10, wherein the processor is configured to send commands to program the tunnel from each previous point of attachment network element in the list to the most recent root network element with a higher priority than that used for non-tunneling traffic forwarding as a result of a network convergence procedure.

13. The apparatus of claim 10, wherein the processor is configured to initiate a timer after the list of network elements is updated, and at expiration of the timer, send commands to the network elements to which the host has roamed to purge any tunnels associated with the roaming of the host that are programmed in the network elements to which the host has roamed.

14. The apparatus of claim 10, wherein the processor is configured to send commands to the network elements to which the host has roamed to remove the tunnels created during roaming of the host during execution of a network convergence procedure to replace a tunnel forwarding path for traffic flow for the host with a normal forwarding path.

15. The apparatus of claim 10, wherein the processor is configured to send commands to the network elements to which the host has roamed to remove the tunnels created during roaming of the host after execution of a network convergence procedure such that a tunnel forwarding path has a higher priority than normal forwarding paths during network convergence.

16. The apparatus of claim 15, wherein the processor is configured to send commands by sending commands to the network elements to which the host has roamed to replace a tunneling forwarding path for a flow for the host with a normal forwarding path during network convergence.

17. The apparatus of claim 10, wherein the processor is configured to detect when a host has moved between network elements by detecting a roam of the host based on a layer 2 address of the host.

18. The apparatus of claim 10, wherein the processor is configured to detect when a host has moved between network elements by detecting a roam of the host based on a layer 3 address of the host.

19. One or more non-transitory computer readable storage media encoded with instructions that, when executed by a processor, cause the processor to:
   at a software defined network controller for a network comprising a plurality of network elements in communication with the controller, each of the network elements capable of serving as a point of attachment of a virtual or physical host, detecting when a host has moved between network elements;
   generate a list of network elements to which the host has roamed, the list being sorted by time when the host is attached to a network element so that a most recent network element to which the host is attached is the root network element and at a head of the list;
   update the root network element in the list first for traffic flow associated with the host; and
   send commands to the network elements to which the host has roamed to program a tunnel from each previous point of attachment network element in the list to the most recent root network element in the list in reverse order of the roaming path so as to route traffic for the host via a tunnel.

20. The non-transitory computer readable storage media of claim 19, further comprising instructions operate to:
   store data representing a maximum number of network elements to which a host may roam; and
   terminate generating the list when it is determined that the host has roamed to more than the maximum number of network elements.

21. The non-transitory computer readable storage media of claim 19, wherein the instructions operable to send commands comprise instructions operable to send commands to program the tunnel from each previous point of attachment network element in the list to the most recent root network element with a higher priority than that used for non-tunneling traffic forwarding as a result of a network convergence procedure.

22. The non-transitory computer readable storage media of claim 19, further comprising instructions operate to initiate a timer after the list of network elements is updated, and at expiration of the timer, send commands to the network elements to which the host has roamed to purge any tunnels associated with the roaming of the host that are programmed in the network elements to which the host has roamed.

23. The non-transitory computer readable storage media of claim 19, wherein the instructions operable to send commands comprise instructions operable to send commands to the network elements to which the host has roamed to remove the tunnels created during roaming of the host during execution of a network convergence procedure to replace a tunnel forwarding path for traffic flow for the host with a normal forwarding path.

24. The non-transitory computer readable storage media of claim 19, wherein the instructions operable to send commands comprise instructions operable to send commands to the network elements to which the host has roamed to remove the tunnels created during roaming of the host after execution of a network convergence procedure such that a tunnel forwarding path has a higher priority than normal forwarding paths during network convergence.

25. The non-transitory computer readable storage media of claim 24, wherein the instructions operable to send commands comprise instructions operable to send commands to the network elements to which the host has roamed to replace a tunneling forwarding path for a flow for the host with a normal forwarding path during network convergence.

26. The non-transitory computer readable storage media of claim 19, wherein the instructions operable to detect when a host has moved between network elements comprise instructions operable to detect when a host has moved between network elements by detecting a roam of the host based on a layer 2 address of the host.

27. The non-transitory computer readable storage media of claim 19, wherein the instructions operable to detect when a host has moved between network elements comprise instructions operable to detect when a host has moved between network elements by detecting a roam of the host based on a layer 3 address of the host.

* * * * *